United States Patent
Khalid et al.

(10) Patent No.: US 12,448,975 B2
(45) Date of Patent: Oct. 21, 2025

(54) SUMP PUMP SYSTEM AND METHOD

(71) Applicant: Pentair, Inc., Minneapolis, MN (US)

(72) Inventors: Hassan Khalid, Greenfield, WI (US); Brian Broga, Elkhorn, WI (US); Bill Hinz, Minneapolis, MN (US); Matthew Meyer, Minneapolis, MN (US); Deelep Gupta, Uttar Pradesh (IN); Aditya Sharma, New Delhi (IN); Shijin Joseph, Delhi (IN)

(73) Assignee: Pentair, Inc., Minneapolis, MN (US)

( * ) Notice: Subject to any disclaimer, the term of this patent is extended or adjusted under 35 U.S.C. 154(b) by 221 days.

(21) Appl. No.: 17/930,906

(22) Filed: Sep. 9, 2022

(65) Prior Publication Data
US 2023/0074197 A1 Mar. 9, 2023

Related U.S. Application Data

(60) Provisional application No. 63/261,051, filed on Sep. 9, 2021.

(51) Int. Cl.
| | |
|---|---|
| F04D 15/02 | (2006.01) |
| G01F 15/063 | (2022.01) |
| G01F 23/26 | (2022.01) |
| G08B 21/18 | (2006.01) |
| H04Q 9/00 | (2006.01) |

(52) U.S. Cl.
CPC ....... *F04D 15/0218* (2013.01); *G01F 15/063* (2013.01); *G01F 23/261* (2013.01);
(Continued)

(58) Field of Classification Search
CPC .......... F04B 2207/00; F04B 2207/02; F04B 23/021; F04B 49/02; F04B 49/065;
(Continued)

(56) References Cited

U.S. PATENT DOCUMENTS

| | | | |
|---|---|---|---|
| 7,755,318 B1* | 7/2010 | Panosh | F04B 49/065 417/18 |
| 8,380,355 B2* | 2/2013 | Mayleben | G01F 23/268 700/282 |

(Continued)

FOREIGN PATENT DOCUMENTS

WO 2014066687 A2 5/2014

OTHER PUBLICATIONS

Extended European Search Report, EP Application No. 22194878.9, dated Jan. 30, 2023, 9 pages.

*Primary Examiner* — Mark A Laurenzi
*Assistant Examiner* — Benjamin Doyle
(74) *Attorney, Agent, or Firm* — Husch Blackwell LLP

(57) ABSTRACT

A system and method for remotely monitoring a sump pump system are disclosed. The sump pump system comprises a control system connected to an integrated arrangement of a sensor chamber and a sump pump. The sensor chamber includes a pressure sensor and a capacitive touch sensor for measuring the water level to automatically turn the sump pump on when the water rises to a preset level. A wireless controller is connected to the system, for wirelessly receiving monitoring instructions and wirelessly transmitting sump pump status data to a remote device. Further, a user can configure a water-attribute value by using an application in the remote device. The user can operate and manage sump pump data via the application.

13 Claims, 5 Drawing Sheets

(52) U.S. Cl.
CPC ............. *G08B 21/182* (2013.01); *H04Q 9/00* (2013.01); *H04Q 2209/40* (2013.01); *H04Q 2209/86* (2013.01)

(58) Field of Classification Search
CPC .... F04B 49/10; F04D 13/086; F04D 15/0218; G01F 15/063; G01F 23/261; G08B 21/182; H04Q 2209/40; H04Q 2209/86; H04Q 9/00
See application file for complete search history.

(56) References Cited

U.S. PATENT DOCUMENTS

| | | | |
|---|---|---|---|
| 9,200,630 B1* | 12/2015 | Huff | F04D 15/0218 |
| 9,709,431 B1* | 7/2017 | Kinney | E03F 1/002 |
| 10,711,788 B2* | 7/2020 | Mayleben | F04D 13/068 |
| 2013/0197700 A1* | 8/2013 | Kochan, Jr. | F04B 49/065 700/282 |
| 2014/0119947 A1* | 5/2014 | Bishop | G05B 15/02 700/275 |
| 2014/0119950 A1* | 5/2014 | Bishop | F04D 15/0218 73/290 R |
| 2015/0240803 A1* | 8/2015 | Knight | F04B 49/065 73/168 |
| 2017/0175746 A1* | 6/2017 | Mayleben | F04D 13/086 |
| 2017/0370628 A1* | 12/2017 | Knatt | F25C 1/25 |
| 2018/0017459 A1* | 1/2018 | Banta | F04F 1/20 |
| 2019/0307083 A1* | 10/2019 | Henry | E02B 13/00 |
| 2019/0353156 A1* | 11/2019 | Ward | F04D 13/08 |
| 2020/0132068 A1* | 4/2020 | Rupp | F04B 49/10 |
| 2021/0235964 A1* | 8/2021 | AlHaffar | A47L 15/0023 |

* cited by examiner

SUMP PUMP SYSTEM AND METHOD

CROSS-REFERENCE TO RELATED APPLICATIONS

This application claims priority to U.S. Provisional Application No. 63/261,051 filed on Sep. 9, 2021, the entire contents of which are incorporated herein by reference.

TECHNICAL FIELD

The present disclosure generally describes water presence detection methods and systems relating to remotely monitoring the operation of sump pump systems.

BACKGROUND

The management of water is of paramount importance for modern societies. Many industrial applications require the installation of multiple data-acquisition systems to measure liquid level and/or volume in tanks and containers. Further, water quality data typically includes various physical and chemical parameters, such as but not limited to water level, temperature, conductivity, turbidity, pH, and other parameters.

In one example, homes may have basements that use a sump pump having a water level detection mechanism to prevent flooding. Basement flooding can cause substantial damage and result in costs to the homeowner. In some instances, multiple sump pumps may be used in a household basement to help warn of a flooding condition. Sumps are low pits or basins designed to collect undesirable liquids such as water around the foundation of a home. Water that seeps into the home from the outside can flow into the sump to prevent water from spreading throughout the home. If too much water seeps into the sump, a sump pump is designed to remove water that has accumulated therein and discharges the water away from the home.

A typical sump pump includes a pump to remove water from a sump basin, and various switches and related components that turn the pump on and off when appropriate based on the water levels in the sump. In particular, the sump pump can have a float switch that triggers operations of the pump when the water level exceeds a predefined thresh hold.

Float switches for sump pumps normally include open relays, allowing the pump to be inactive when a floating component (e.g., a float) of the float switch is in the lowered position, and to activate when the float is in a higher or raised position. As fluid enters the basin, the float rises to trigger a switch that turns the pump on. Once the pump has lowered the fluid level to a level below the predefined thresh hold point, the float triggers the switch to turn the pump off.

Conventional float switches can fail due to an incorrect configuration of the switch, poor maintenance, using a float switch that is not designed for the purpose, and/or using a float switch that is not properly rated for the application, etc.

Embodiments disclosed herein are directed to an improved system and method for detecting the water level or water presence in a sump pit, tank or pipe, or any other receptacle. In particular, these systems and methods provide improvements over conventional mechanical float switches. For example, mechanical switches, such as float switches, are susceptible to physical damage as well as poor maintenance. If float switches are not properly maintained, their lifetime can be significantly reduced causing early failure. Also, float switches have movement failures that make them less reliable. Because the sump environment can be dirty, corrosive, and in some instances hazardous, if no maintenance checks are being carried out regularly when the switch is exposed to these conditions, debris, and dirt often jams in the moving parts of the float switch causing false and unreliable readings. This exposure can also lead to malfunction or costly equipment damage and system downtime. Additionally, many customers often find themselves in a situation where the float switch is failing because a switch is made with a specific mechanical configuration or is otherwise not suited for the application. Moreover, certain mechanical switches, such as float switches, are expensive to purchase and maintain, and are prone to failure in high-demand, high-use, or other harsh settings and environments.

Some known sump pump systems are limited due to a relatively small measurement range or the use of special high-cost scientific equipment, which is not convenient for transportation, installation, and long-term maintenance. Therefore, there is a need for an improved method and system for a reliable and cost-effective water level detection mechanism in a sump pit, in a water tank, reservoir, or any other vessel. Also, it would be beneficial to remotely control the sump pump operation, for example, through a user application and/or mobile device.

SUMMARY

In accordance with some embodiments of the present disclosure, systems and methods for monitoring the operation of a sump pump are provided. The system and method of the system provide for the ability to monitor and control sump pumps, and in particular, to overcome the shortcomings relating to the use of a mechanical float switch.

In accordance with one embodiment, a system for remotely monitoring and controlling a sump pump is provided. The system comprises a controller in electrical communication with the sump pump, the controller configured to regulate the sump pump based on a measured pressure and a measured water level. In some embodiments the controller may be a control system. The system further includes a sensor chamber connected to the sump pump, the sensor chamber in electrical communication with the controller. The sensor chamber includes a primary sensor configured to measure a pressure value, and a secondary sensor configured to measure a water level value. The system further includes a wireless controller connected to the controller, the wireless controller configured to wirelessly receive monitoring instructions and wirelessly transmit sump pump status data. The system further comprising a remote device communicatively connected to the controller, the controller configured to transmit the sump pump status data to the remote device, wherein a user configures a water level set point value in the remote device. The system also includes a notification system, the notification system designed to generate and transmit an alert to the remote device when the measured water level exceeds the water level set point value.

In another embodiment, the remote device is a smartphone, a tablet, a laptop, or an internet-enabled device. The remote device can be further configured to monitor a plurality of water level attributes.

In another embodiment, the sensor chamber detects a current measured water level in a sump pump at a first time. The sensor chamber can also determine a water fill time, wherein the water fill time is determined by a measured pressure value and a measured water level value.

In another embodiment, the notification system is further configured to generate and transmit the alert to the remote device when the system detects one or more of: a locked rotor, an overcurrent, a dry run condition, a clogged discharge line, a high water alarm, a pump failure, a pump malfunction, an above ground leak, or an underground leak.

In another embodiment, the primary sensor is a pressure sensor and the secondary sensor is a capacitive sensor. The primary sensor includes a pressure transducer attached to the sensor chamber to detect the measured pressure, the pressure transducer configured to detect a change in water level that indicates whether the water level is rising or falling. In a further embodiment, the capacitive sensor is affixed adjacent to the pressure transducer of the sensor chamber.

In accordance with another embodiment, a method of monitoring and controlling a sump pump is provided. The method comprising the steps of detecting a value representing a current water level using a sensor chamber. The sensor chamber includes a primary sensor and a secondary sensor. The method further including sending the value using a wireless controller to a control system in electrical communication with the sensor chamber and the wireless controller operating the sump pump. The method further comprising the step of comparing the value to a value predefined setpoint using the control system and generating a notification based on the comparing step. The method also includes transmitting, by the controller, the notification using a notification system to a remote device. The remote device receives a user input defined by the value setpoint.

In another embodiment, the method includes the control system in electrical communication with the sump pump.

In another embodiment, the method includes the notification being wirelessly transmitted via an internet connection.

In another embodiment, the method further includes the step of pairing the sump pump with the remote device. In a further embodiment, the method comprises controlling the sump pump via the remote device, wherein the controlling can include manually controlling the sump pump via the user input, or automatically controlling the sump pump according to at least one preconfigured water level attribute. The remote device is designed to store the at least one preconfigured water level attributes.

In another embodiment, the method further comprises the step of measuring the water level in a sump pit at a first time period.

According to another embodiment of the present disclosure, a method of monitoring and controlling a sump pump is provided. The method comprising the steps of: detecting a water level using a primary sensor and detecting a pressure level by a secondary sensor. The method further comprising: sending the water level and the pressure level to a control system using a wireless controller. The control system is designed to operate the sump pump. The method also includes the steps of determining a water fill time and comparing the water fill time to a threshold value using the control system. The method also includes toggling an operating signal to the sump pump using the control system, wherein the operating signal is an "on" signal or an "off" signal, each of the "on" signal and the "off" signal associated with operating the sump pump in response to the water fill time exceeding the threshold value. The method further comprises generating a notification using a notification system in response to the toggling step and transmitting the notification to a remote device.

In another embodiment, the method further comprises the steps of detecting a change in water level using the sensor chamber, wherein the sensor chamber includes the primary sensor and the secondary sensor.

In another embodiment, the method further includes monitoring the sump pump using a printed circuit board (PCB), wherein the PCB is positioned within a housing of the controller and is electrically coupled to a wireless controller.

In another embodiment, the method further comprises detecting a failure of the primary sensor using the secondary sensor. The method also includes generating an alert using the notification system in response to detecting the failure of the primary sensor and transmitting the alert to the remote device.

DESCRIPTION OF THE DRAWINGS

Examples are described with reference to the following drawing figures. The same numbers are used throughout the figures to reference features and components.

DETAILED DESCRIPTION

Figure 1:
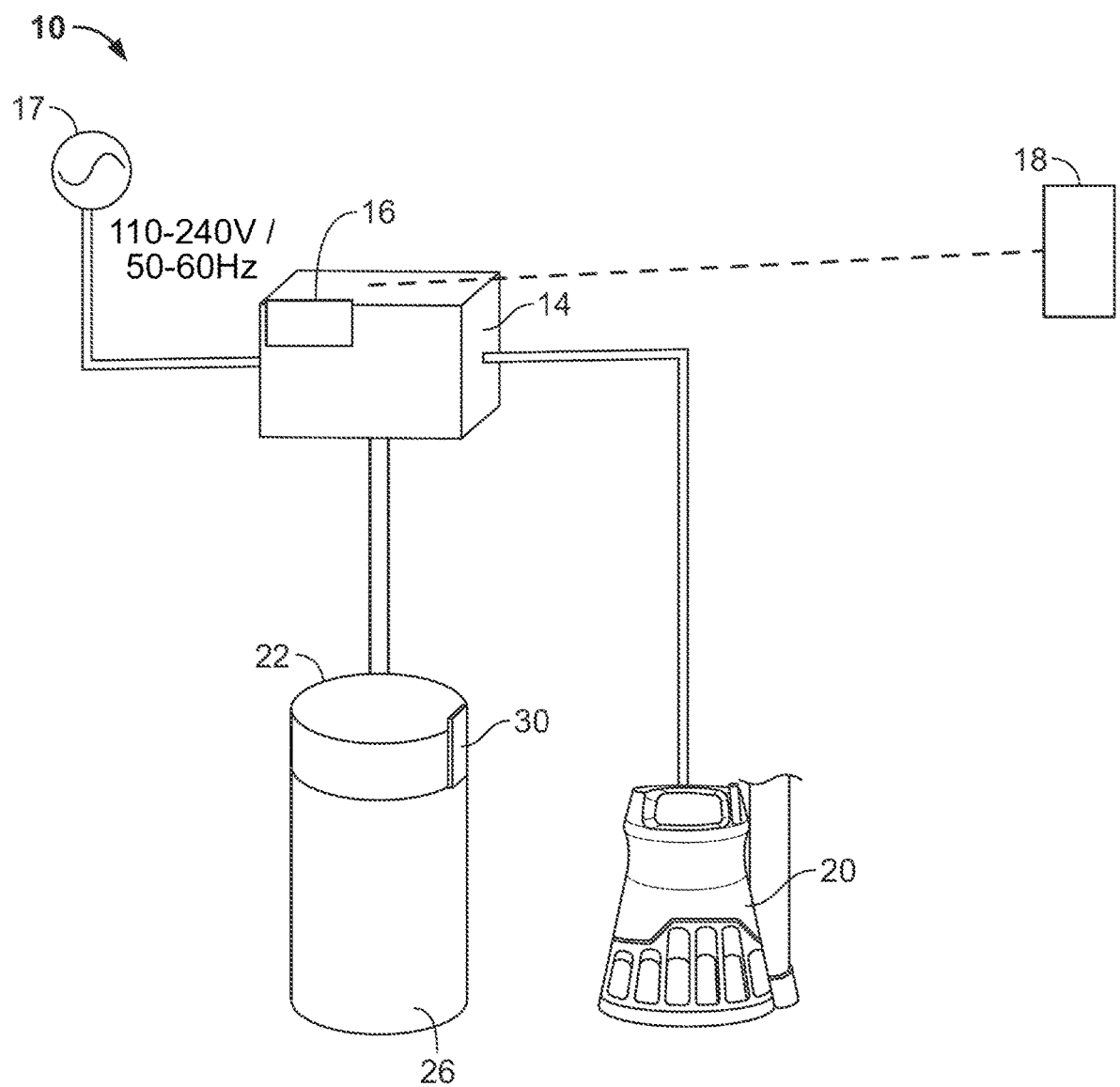
FIG. 1 is a schematic view of a sump pump system according to disclosed embodiments.

Before any embodiments of the invention are explained in detail, it is to be understood that the invention is not limited in its application to the details of construction and the arrangement of components set forth in the following description or illustrated in the following drawings. The system is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," "controlled," "coupled," and "communicated" and variations thereof are used broadly and encompass both direct and indirect mountings, connections, supports, controls and couplings. Further, "connected" and "coupled" are not restricted to physical or mechanical connections or couplings and can also include electrically and communicatively coupled configurations, in addition to other forms of connections or couplings.

The following discussion is presented to enable a person skilled in the art to make and use embodiments of the system. Various modifications to the illustrated embodiments will be readily apparent to those skilled in the art, and the generic principles herein can be applied to other embodiments and applications without departing from embodiments of the system. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the system. Skilled artisans will recognize the examples provided herein have many useful alternatives and fall within the scope of embodiments of the invention.

Water level sensors are used for monitoring the level of water in a storage tank, in a container, in a sump pit, basin, or in any other receptacle, etc. Water level sensors can include, for example, contact and/or non-contact sensors. The water level sensors can use various measurement principles such as pressure sensors, capacitive devices, optical sensors, ultrasonic-ranging sensors, radar sensors, laser-ranging sensors, and other sensing devices. The embodiments described herein use a plurality of sensors to sense a water level, such as, in a non-limiting example, a pressure sensor and a capacitive sensor.

In comparison with other types of sensors, capacitive sensors result in low-power, low-cost, and robust sensing solutions. The operational characteristics and performance of a novel capacitive-pressure sensor water level measurement technique achieves excellent performance and simultaneously exhibits a much lower manufacturing cost.

The present disclosure also provides an improved method to monitor the level of water in a container such as a sump pit. The present disclosure also provides a secondary system and method of detecting water to avoid flooding in case of failure of the primary system (e.g., sensor) and allows for preventative maintenance before the failure occurs. The embodiments described herein can be used for proper operation of a sump pump system to maintain a dry basement and avoid costly water damage. The sump pump operation system can also include one or more warning, notification, or alarm systems to generate alerts, alarms, and similar when there is a triggering event detected by the system, like a malfunction or possible flooding condition. Sump pump systems can also be equipped with an alarm or notification system to transmit messages via a communication signal. In some embodiments the alarm or notification can include audible alarms, high audible alarms, visual, tactile, and/or other types of notifications and user notifications. In some embodiments, the communication link can include, but is not limited to, one or more of: text, e-mail, push notification, or a phone call to a user. Triggering events for the alarm system to generate and transmit a notification can include, but are not limited to: pump malfunction, power outage, water leakage, or high water (flooding) conditions. Further, the present method controls the pump cycle time from a user application.

Some embodiments include non-moving water level sensing technology based on pressure and/or capacitive touch sensors, which eliminates the need for mechanical float switches, which may have maintenance issues and functional limitations.

Additionally, the embodiments described herein can provide remote monitoring of the sump pump systems. This remote monitoring can include detecting an abnormality and sending a notification of the abnormality to a user or customer. These abnormalities can include, for example, a locked rotor, an overcurrent, a dry run condition, a clogged intake, a frozen or clogged discharge line, underground or above ground leaks, and other component or system errors, malfunctions, or other defined parameters. The defined parameters can also help in determining and monitoring the health of the sump pump.

The system can also monitor the fill time for a sump pit/basin and this information can be used to detect potential underground and above-ground leaks, sump pump failure, or other system malfunctions. From the water fill time parameter, the system can transmit a notification of potential errors, malfunctions, or failures due to a water leak or improper water level in a basin, pit, tank, pipe, container or any other vessel. The system can further operate as an independent leak detection system and notify the user of the presence of a water leak by monitoring the water level in the pit.

In another embodiment of the present disclosure, a method of monitoring and controlling a pump by detecting a value by a sensor chamber is provided. The value is defined by a water level parameter and the sensor chamber comprises a primary sensor and a secondary sensor. The method further sends the value to a controller in electrical communication with the sensor chamber. The controller further operates the pump and transmits a notification based on the value to a remote device. The notification is transferred via an SMS or text, an e-mail, or an in-app message and their combination thereof. Further, a user can configure a water level threshold value in the remote device. The water level threshold value comprises different water level attributes to operate the pump through an application in the remote device.

The sensor chamber can include a pressure sensor as the primary sensor to measure water presence and a capacitive touch sensor as a secondary sensor for detecting the high-water level. The secondary sensor can function as a backup sensor if the primary sensor fails. The sensor chamber is provided in the form of a housing having an opening that allows water to enter.

Some embodiments provide a sump pump system with selectable system settings. Selectable system settings may include one or more operating parameters. In some embodiments, the operating parameters can be modified according to user input via a remote device. Further, the water level attributes comprise health tests of the pump such as overcurrent, locked rotor, pressure sensor, dry run, current sensor, pump fault, high water alarm, buzzer functionality, a pump control task, and alarm settings. In some embodiments, the system may adjust water level attributes or selectable system settings automatically, in response to the measurements of the sensor chamber and the sensors therein.

In accordance with some other embodiments, the controller includes a printed circuit board (PCB) positioned within a housing, a power supply in electrical communication with components coupled to the PCB, and a wireless gateway module coupled to the printed circuit board. The wireless gateway module is configured to establish a wireless connection to a first wireless network and transmit a message to a remote server over the first wireless network. The controller further includes a microcontroller coupled to the PCB.

A remote server to allow for wireless data transmission, such as sending updates or real-time errors and user notifications is also provided. A remote device paired with the sump pump system can receive and display sump pump data as well as allow default settings to be set by the user. The user can manage and control the sump pump based on the data generated by sensors. Self-testing can be configured at any desired interval. The sensor chamber comprises a primary and secondary sensor that is connected with a sump pump and works as an integrated assembly. In another embodiment, the sensor chamber comprises a hollow tube with an opening that allows water to enter.

Further, notifications can be sent to a user via text, email, instant message, or through using a user application. Each message can include remote access and local access links so the user can click and open a remote interface of their pump anytime, from anywhere. The interface can be designed to display water fill time data, alarm management, equipment testing, and modification of all sump pump settings.

Auxiliary alarms can be sent using the controller's Ethernet/internet, dialer, or home security system for high water level by the secondary sensor i.e. capacitive touch sensor using a sensing area to detect the high reach of the water.

Also, the system is designed to immediately recognize a problem with the sensors. If there is primary sensor failure or if the sump pump has stopped working, the controller can rely on the secondary sensor to detect the high-water level and trigger an alarm.

The disclosed system can comprise an integrated notification system providing service alerts and reminders. Owners or users could receive text alerts, email alerts, application notifications, push notifications, and other types of notifications when there is any abnormality in the system. The remote access to the customer or user provides unprecedented access and control to the flood prevention system. In several embodiments, the system can be remotely controlled and monitored through the internet.

A primary electric sump pump utilizes a controller to monitor standard operation. This allows for several advantages, such as pump self-testing, failure prediction, and remote control, monitoring, and management. Data on pump operation can be tracked and displayed for the homeowner on a remote device.

Thus, proper operation of the sump pump system is important for maintaining a dry basement and avoiding costly water damage. In light of this, various methods to detect water leakage and high-water level through different means are available when a malfunction or possible flooding condition is detected. The present disclosure provides a more reliable way to overcome the existing art. The primary and secondary sensors are reliable and cost-effective in comparison to conventional float switches. Conventional float switches are expensive and often lead to failure due to their heavy mechanical switches which physically move whenever there is a rise in the water level. In contrast, embodiments of the disclosed sensor chamber comprise a pressure sensor with a capacitive sensor, which uses a non-moving technique (e.g., does not physically move) with accurate and reliable results.

Aspects of the present disclosure are related to monitoring a sump pump system. More specifically, certain embodiments relate to a connected system of a combination of hardware and software components or system(s), and associated processing techniques that monitor the operation of a sump pump system and generate a notification, alert, or alarm to the homeowner/user/customer. This notification system can alert the user of possible issues with the system or system operating parameters so the user can take remedial action to avoid or reduce the effects of a sump overflow or other system malfunction.

FIG. 1 illustrates an exemplary sump pump system 10. As seen in FIG. 1, the sump pump system 10 can include a sensor chamber 26 in communication with and/or incorporated into the sump pump system 10. The sensor chamber 26 is in electrical communication with a pump 20 of the sump pump 10. In particular, the sump pump system 10 is designed to prevent basement or underground flooding by collecting groundwater from a sump basin 13 (see FIG. 3) and discharging the collected water away from the sump basin 13. The sump pump system 10 can pump water from the sump basin 13 and discharge the water away from the home.

To ensure the sump pump system 10 is operating as intended, the sump pump system 10 can further include a control system 14. The control system 14 can include a wireless controller 16 that can monitor the sump pump 20, determine the operating status of the sump pump 20, and report one or more maintenance conditions, operating parameters and/or other information related to the sump pump 20. In particular, the control system 14 can determine and send a status message to a remote device 18 wirelessly via the wireless controller 16. In some embodiments, the controller may include a wired connection and/or be configured to transceiver information using multiple types of communication techniques.

In some embodiments, the sump pump system 10 includes the sump pump 20 in communication with the control system 14. The sump pump 20 may be powered by AC power. In some embodiments, alternative power sources for the sump pump 20 may be used, including but not limited to, one or more batteries.

The sensor chamber 26 is designed to be installed into a sump pit, or other fluid container application having a reservoir for water, in such a way that as the water level rises in the sump pit, the water will rise within the sensor chamber 26. The sensor chamber 26 is provided in the form of a cylindrical housing that includes a primary sensor 22 disposed in an upper portion of the sensor chamber 26. The primary sensor 22 can be provided in the form of a pressure transducer attached on the top of the sensor chamber 26 to measure the pressure in the sensor chamber 26, which corresponds to the rising water level in the sump basin 13 (see FIG. 3). Further, the primary sensor 22 can include a sensor capable of converting the pressure into electrical signals that are then transmitted to the control system 14. The sensor chamber 26 also may include a secondary sensor 24 attached adjacent to the primary pressure sensor 22. In some non-limiting embodiments, the secondary sensor 24 can be provided in the form of a capacitive touch sensor. The secondary sensor 24 can be used to determine a high-water level in the sump basin 13.

Sensing the water level using a capacitive touch sensor as the secondary sensor 24 provides improvement over the existing prior art. The capacitive touch level sensors can be used for a plurality of most any solid and/or liquid. These sensors have no moving parts and scale incredibly efficiently. They make no contact with the liquid or solid and are even used for more corrosive liquids.

The main advantages of these capacitive touch sensors are they are low cost, consume minimal power, and are linear. The capacitive-type liquid level sensor is more efficient than mechanical counterparts because of its low cost, linearity, and good repeatability. Additionally, the operational characteristics and performance of novel capacitive-pressure sensors, for example those described in connection with the primary sensors 22, are advanced water level measurement techniques that achieves equivalent performance in comparison to a commercially available mechanical switch water-level sensing device, but with a much lower manufacturing cost.

Further, the capacitive touch sensor is constructed using widely available multilayer tubes, which are also used in drinking water systems. Thus, both the manufacturing cost of the sensor(s) and the cost of the associated electronic circuits, which are used for interfacing the sensor to a digital control unit, are low. The performance of the sensor chamber 26 and the experimental results indicate that the accuracy of the proposed sensor(s) are at least equivalent, if not better, than conventionally available mechanical switches, at a significantly lower cost. Capacitive sensing technologies provide high sensing capabilities with low power consumption and at a lower cost.

Figure 2A:
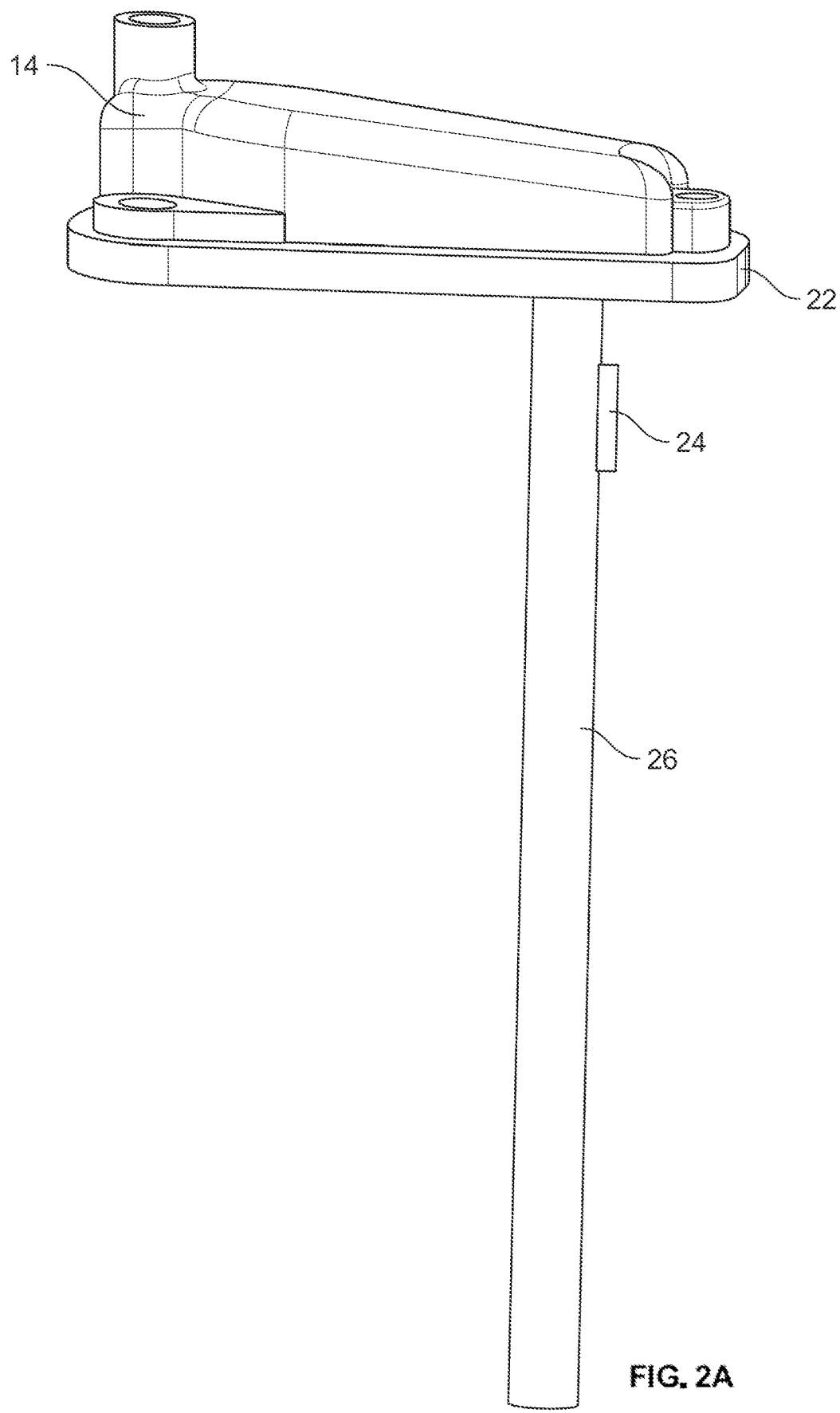
FIGS. 2A and 2B depict a side elevational view of a sensor chamber of the sump pump system of FIG. 1.
Figure 2B:
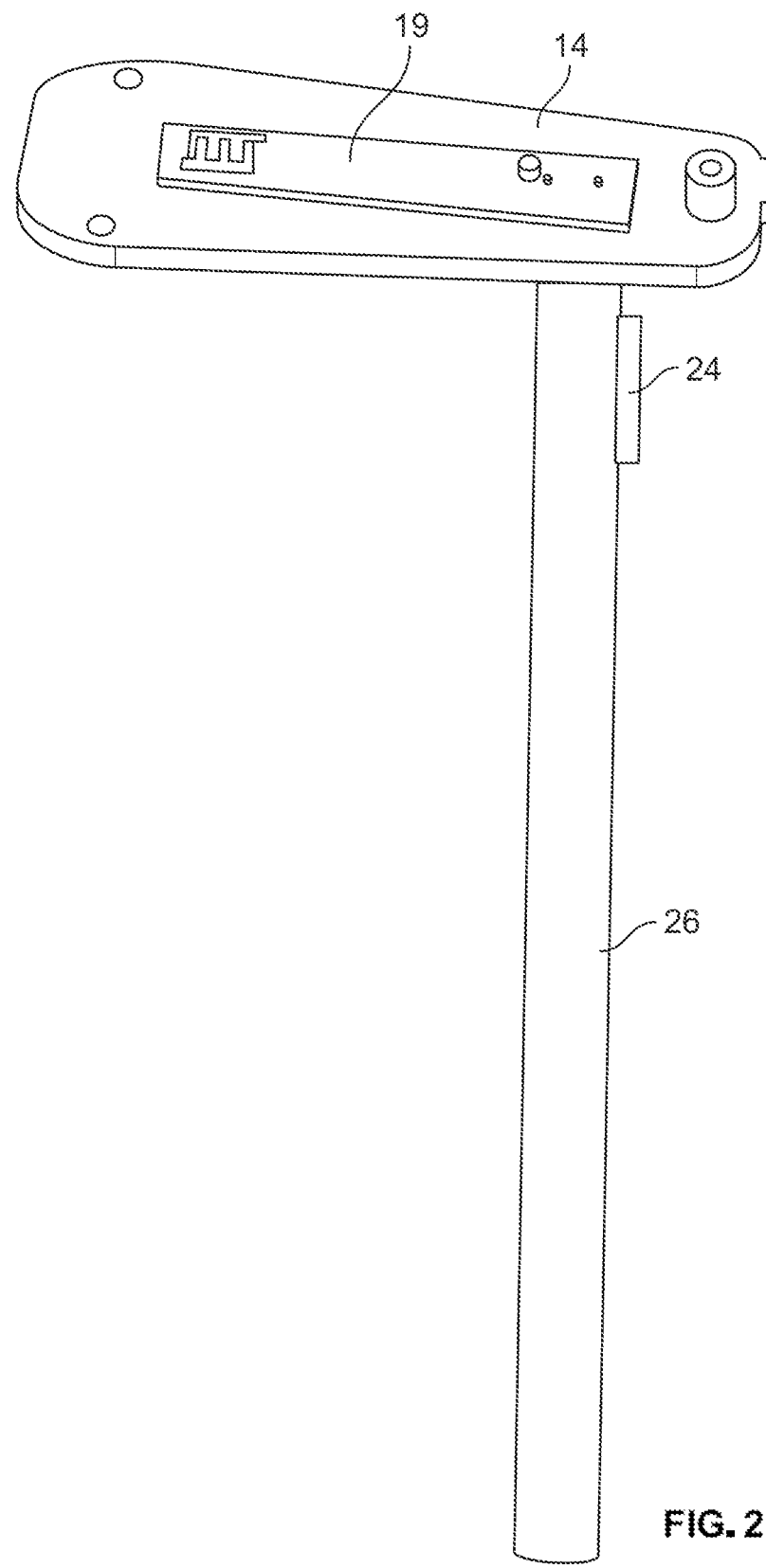

FIGS. 2A and 2B show various configurations of the sensor chamber 26. As shown in FIG. 2A, the sensor chamber is a cylindrical housing with an opening in a bottom portion thereof. The housing includes the primary sensor 22 disposed on a top end thereof and the secondary sensor 24 disposed on the housing below and adjacent to the primary sensor 22.

As shown in FIG. 2B, the control system 14 can include a printed circuit board (PCB) 19 positioned within the housing, and the wireless controller 16 (see FIG. 1) can include a wireless gateway module coupled to the PCB 19. A power supply 17, portable or otherwise, can be in electrical communication with components coupled to the PCB 19. The PCB 19 and/or control system 14 can include a user interface and/or various indicators positioned to receive user input and/or to control the sump pump system 10 locally. The wireless controller 16 is configured to establish a wireless connection to a first wireless network (not shown) and transmit a message to a remote server over the first wireless network. In some embodiments, the control system 14 further includes a microcontroller coupled to the PCB 19. In some embodiments the wireless controller 16 can include a wireless transceiver coupled to the PCB 19 through a chip. The wireless transceiver is responsible for communication that occurs between the system and the remote device 18. In some embodiments, the remote device 18 can send one or more instructions that cause the control system 14 to connect to the first wireless network and can forward a message from a remote server to the sump pump system 10.

The housing can be configured to support and contain a PCB 19. In some embodiments, the PCB 19 can be electrically coupled to the microcontroller and the wireless gateway module. Alternatively, in some embodiments, the microcontroller can include the wireless gateway module, and the wireless gateway module can be omitted from the PCB 19. Although the control system 14 is described as including the microcontroller, this is merely an example, and any suitable type of hardware processor or combination of hardware processors can be used to monitor and/or control the sump pump 20 and the sensor chamber 26.

As shown, the sump pump 20 can be in electrical communication with the control system 14. Similarly, sensor chamber 26 can be in electrical communication with the control system 14. The control system 14 can include the wireless gateway module. The wireless gateway module can be affixed to the internal PCB 19 within the control system 14.

To configure the water level limit parameter associated with the sensor chamber 26, the sensor chamber 26 is provided with a sensing area 30 (see FIG. 1). The sump pump 20 also includes a drainpipe 33 (see FIG. 3) attached to the sump pump 20 to transfer excess water from the sump basin 13.

It will be understood by those having skill in the art that the term "sensor" as used throughout the specification can include a number of different sensing devices and/or sensing device configurations. This can include a sensor unit with a plurality of individual sensors, a single sensor with multiple sensing capabilities, or a combination of these.

Referring again to FIG. 1, the wireless controller 16 can be configured to receive data wired or wirelessly for remote monitoring functionality. For example, the wireless controller 16 can transmit data via the internet to an external website for customer interaction. The wireless controller 16 can include an RF transmitter such as an antenna for receiving signals and data from, and transmitting data to, a remote device 18. One skilled in the art will recognize that a communication connection for transmitting and/or receiving data, for example, but not limited to the wireless controller 16, can transmit and receive data using a plurality of communication protocols, including but not limited to: wired, wireless, Bluetooth, cellular, satellite, GPS, RS-485, RF, MODBUS, CAN, CANBUS, DeviceNet, ControlNet, Ethernet TCP/IP, RS-232, Universal Serial Bus (USB), proprietary protocol(s), or other known communication protocol(s) as applicable.

A software application can be operable with the remote device 18, for example, or other smart devices, to access the sump pump system 10 to indicate the system's operational status. The software application can be used to provide remote monitoring of the sump pump system 10 including water fill rate time, water level check, weekly test cycles, and/or alerts, for example. Further, a water level threshold value, or setpoint, can be configured with the remote device 18. The water level threshold value can be used to analyze other water-related attributes, including but not limited to, rising and falling water rates, and operate the sump pump 20 through the application in the remote device 18. In some embodiments, the wireless controller 16 can be programmed to transmit a response to a wireless remote device 18 only if the wireless controller 16 is first queried by the remote device 18. In this way, the wireless controller 16 does not transmit wireless communications unless it is first asked to transmit a wireless communication. It will be appreciated by those skilled in the art that a remote device 18 may include one or more remote devices synced or otherwise capable of communicating with each other and/or the sump pump system 10 independently. It will also be understood that a plurality of operating parameters and system settings can be pre-configured, modified, and monitored by one or more of the system devices or components.

In some embodiments, the wireless gateway module can communicate with a router/modem, which can communicate with a cloud-based server. In some embodiments, the router/modem can include any suitable combination of networking devices (e.g., one or more wireless routers, one or more wired routers, one or more Ethernet switches, one or more cable modems, one or more cellular modems, one or more optical network terminals, etc.). Additionally, the router/modem can include one or more combined devices, such as a combined wireless router and cable modem. In some embodiments, the router/modem can include a standard, off-the-shelf router and/or modem used for connecting to the Internet via an internet service provider (ISP).

In some embodiments, the cloud-based server can communicate with the remote device 18 using any suitable network or combination of networks. In some embodiments, the remote device 18 can be any suitable computing device that can communicate with the cloud-based server via any suitable network or combination of networks. For example, the remote device 18 can be a smartphone, a tablet computer, a wearable computer, a laptop computer, a personal computer, a server computer, a virtual machine being executed by a physical computing device, a virtual personal assistant, a device providing access to a virtual personal assistant (e.g., a smart speaker), etc.

In some embodiments, the remote device 18 can communicate with the cloud-based server via a LAN (e.g., via a router/modem, such as the router/modem, or a different router/modem that is located remotely from the router/modem and is part of a different local area network). In some embodiments, the control system 14 can send and receive information (e.g., messages) to and from the remote device 18 via the cloud-based server. In some embodiments, the cloud-based server can store data received from, or directed to, the control system 14 for later access (e.g., by the remote device).

In alternative embodiments, the control system 14 can connect to the router/modem via another device, such as a hub that coordinates communications between connected devices (e.g., Internet of things devices) and a router. For example, such a hub can connect to one or more connected devices via a ZigBee connection and can receive messages over a ZigBee mesh network from the control system 14 and relay the content of the message to a router in a format that is suitable for transmission over the Internet (e.g., a message formatted in compliance with TCP/IP).

In some embodiments, communications to and/or from the control system 14, the router/modem, the cloud-based server, and/or the remote device 18 can be sent over a communication network, which can be any suitable communication network or combination of communication networks. For example, the communication network can include a Wi-Fi network (e.g., an 802.11x network, which can include one or more wireless routers, one or more switches, etc.), a peer-to-peer network (e.g., a Bluetooth network, a ZigBee® network, a Z Wave® network, a proprietary RF connection, etc.), a cellular network (e.g., a 3G network, a 4G network, etc., complying with any suitable standard, such as CDMA, GSM, LTE, LTE Advanced, WiMAX, etc.), a wired network, an EnOcean® network, etc.

In some embodiments, the communication network can be a LAN, a WAN, a public network (e.g., the Internet), a private or semi-private network (e.g., a corporate or university intranet), any other suitable type of network, or any suitable combination of networks. Communications links between the control system 14, the router/modem, the cloud-based server, and/or the remote device 18 can each be any suitable communications link or combination of communications links, such as wired links, fiber optic links, Wi-Fi links, Bluetooth links, cellular links, etc.

In another example of a communication network for communicating information to and/or from the control system 14 to a remote device 18 in accordance with some embodiments of the present disclosure. In some embodiments, the wireless gateway module can be positioned within the control system 14 and can communicate with a cloud-based server without the use of a router/modem. For example, in some embodiments, the wireless gateway module can be configured to act as a cellular modem.

Alternatively, in some embodiments, the wireless gateway module can communicate with the remote device 18 directly (e.g., via a peer to peer connection such as a Bluetooth connection, a ZigBee Connection, a Z-Wave connection, a Wi-Fi connection in which the wireless gateway module and/or the remote device acts as a discoverable node such as an ad hoc Wi-Fi connection or a Wi-Fi Direct connection, etc.) and/or indirectly (e.g., using a LAN, a WAN, the Internet, a combination of networks, using a mesh network such as a mesh Wi-Fi network, a mesh ZigBee network, a mesh Z-Wave network, etc.). As described above, the remote device 18 can communicate with the cloud-based server via any suitable network or combination of networks. In some embodiments, the control system 14 can send and receive information (e.g., messages) to and from the remote device 18 via the cloud-based server or a peer connection or mesh network.

Figure 3:
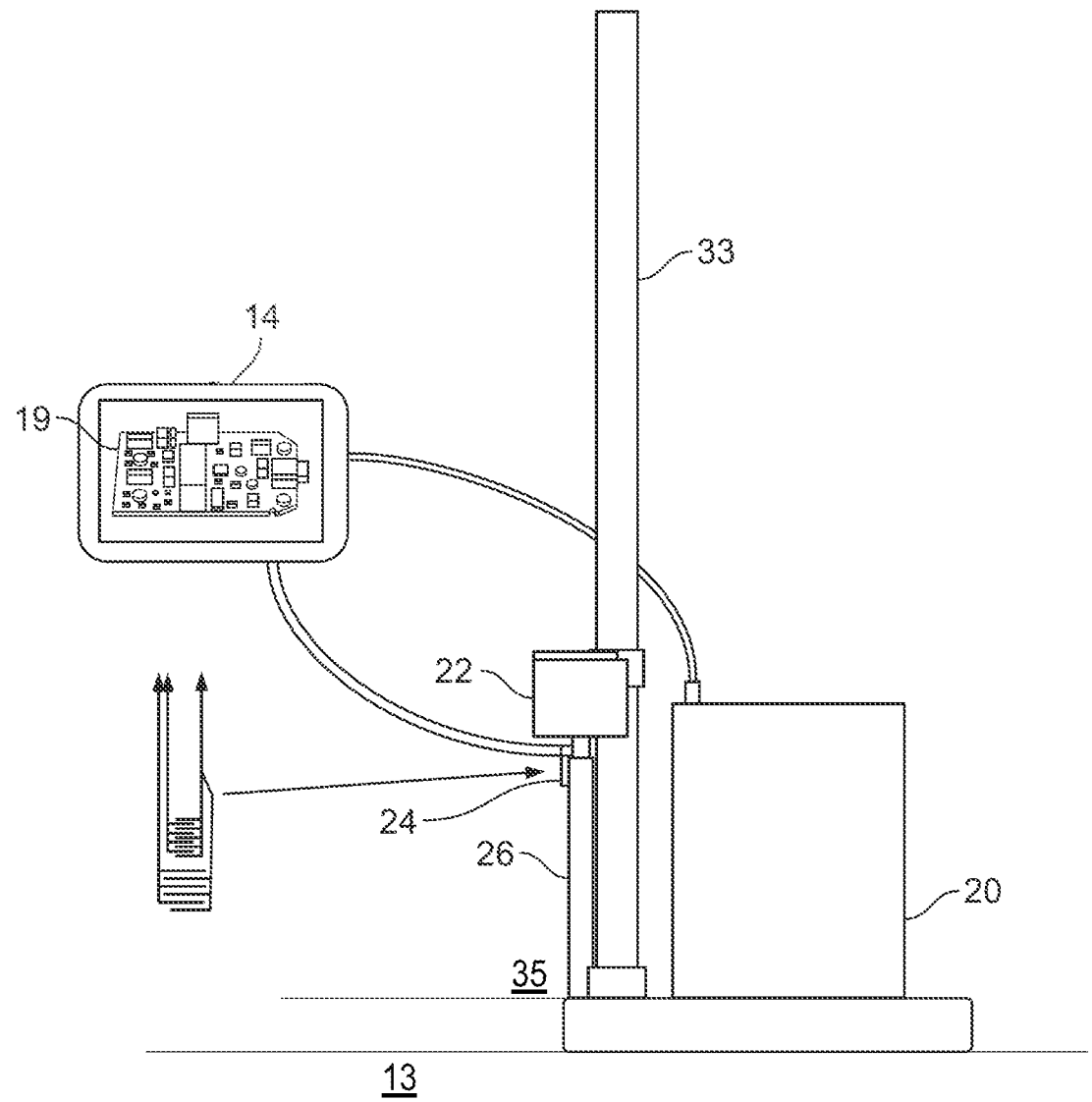
FIG. 3 is a schematic depiction of the sump pump system of FIG. 1 having a sensor chamber.

FIG. 3 illustrates the sensor chamber 26 and the sump pump 20 in an integrated arrangement connected with the control system 14. The control system 14 is in electrical communication with the primary and secondary sensors 22, 24 of the sensor chamber 26 and with the sump pump 20. The sensor chamber 26 can be provided in the form of an elongated tube extending to the bottom of the sump pump basin 13. The sensor chamber 26 has an opening or slot 35 that allows water to enter the internal portion of the chamber 26 when the pressure increases. The sensor chamber 26 can be provided in the form of a housing of any shape or size with an opening or access point where water is in fluid communication with the primary sensor 22 and/or secondary sensor 24. The sensor chamber 26 includes the primary sensor 22 fixed above the sensor chamber 26 to measure, at least, the pressure in the sensor chamber 26. The sensor chamber 26 further includes a minimum water fill parameter marked at the bottom of the sensor chamber 26 to set the minimum amount of water present in the basin 13. The sensor chamber 26 includes a secondary sensor 24 to determine whether water in the sensor chamber 26 and/or the basin 13 rises above a certain level. In some embodiments, the secondary sensor 24 is provided in the form of a capacitive touch sensor 24. The secondary sensor 24 is attached adjacent to the pressure transducer 22. If the primary pressure sensor 22 fails to perform its function, the secondary sensor 24 handles the failure of the primary sensor 22. The secondary sensor 24 can also sense a parameter change in the sensing area 30 (see FIG. 1) to sense the high-water level and switch on an alarm in an emergency. The secondary sensor 24 can also be a limit sensor.

Moreover, during operation, an alarm can sound alerting the user when the primary sensor 22 is not functioning. In the event primary sensor 22 fails, the secondary sensor 24 can be activated.

Similarly, in the event the primary sensor 22 fails to keep up with the water inflow to the sump basin 13, the sump basin 13 can fill to a predetermined high level. At this point, the secondary sensor 24 can be activated to provide one or more signals to the control system 14 such the control system 14 can instruct the sump pump 20 to lower the water level to a predetermined low level. When the water level has lowered below the threshold (e.g., normal operation), the system 10 can proceed to a reset condition whereby the sump pump 20 is provided with default settings in preparation for the next water occurrence. The sensor chamber 26 further includes the PCB 19 installed within the control system 14 to operate the sump pump 20.

Figure 4:
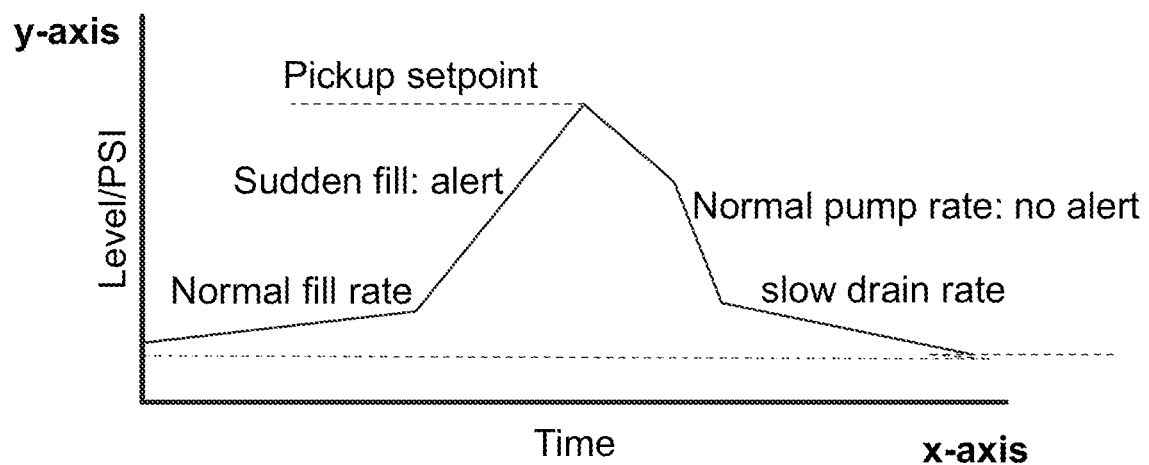
FIG. 4 is a graphical representation of water level with pressure rises over a time period.

FIG. 4. depicts a graphical representation denoting the pressure level on the y-axis and time on the x-axis. The graph shows a fill rate of water level over time, whereas, in case of an increase in water fill rate in any emergency, the sump pump system 10 is designed to inform the user of the potentially hazardous situation by sending an alert and activating an alarm when water reaches a high level and/or exceeds the predetermined thresh hold. The graphical representation illustrates the sump pit behavior over time. The sump pump system 10 determines and notifies the user of the presence of a water leak by monitoring the pit behavior. The remote device 18 operated by the user can receive the notification transmitted via the wireless controller 16, the user can take the necessary measurements using the remote device 18, and the user can turn the sump pump 20 on or off, including by toggling an operating signal and/or the power signal, from the remote device 18 based on the measurements. In some embodiments, the remote device 18 can automatically turn the sump pump 20 on or off (or increase the pumping speed or flow of the pump) based on the measurement values. After the saturation point or a set point (e.g., the water has receded below the threshold), the sump pump 20 can work at the normal rate, and no alert is transmitted. The remote device 18 can remotely control the sump pump 20 functions and the water level attributes based on the status/data received by the control system 14 and transmitted to the remote device 18. The user can the operate sump pump data at any given point in time. When the pump rate normalizes, the drain rate of water also decreases in the drainpipe 33.

The present system allows preventative maintenance before a problem occurs. The user can control the sump pump 20, receive notifications/alarms, and the user can view history and trends from an application provided on the remote device 18.

Typically, the peak demand for a sump pump 20 is during a rainstorm, hurricane, flooding, or other severe weather. These weather conditions are also the most likely to cause a rise in water level underground and above ground. Alternatively, the system can include one or more batteries to power the sump pump 20 and/or the primary and secondary sensors 22, 24 in case of power failure. When the water level rises in the sump pit/basin 13 above a predetermined height, the control system 14 can turn on the sump pump 20 and lower the water level in the basin 13.

To this end, the control system 14 can utilize information provided via the setup process on the remote device 18 to place a call, send an email message, etc., to the remote device 18 such that the customer can be informed of the operating status of the sump pump system 10. Such reporting can enable a customer or other interested party that is remotely located and away from the home to receive information regarding the operating status of the sump pump system 10 and undertake appropriate remedial action in light of such information.

Further, this disclosure recognizes the need for a more reliable way to overcome the conventional sump pump control techniques and provides an improved method and system using a pressure transducer primary sensor 22 and a capacitive touch secondary sensor 24. The pressure transducer and capacitive touch sensors are reliable and cost-effective in comparison to conventional float switches. Float switches are expensive and often lead to failure due to their heavy mechanical switches that move whenever there is a rise in the water level. The sensor chamber 26 comprises a pressure transducer with a capacitive sensor that is easy to operate and a non-moving technique with accurate and reliable results.

The disclosed system and method includes many features to benefit the customer by providing solutions such as detecting and notifying the customer of any abnormality in the system, lock rotor, overcurrent checks, dry run conditions of the pump, clogged intake, frozen or clogged discharge line, a high water alarm, and notification, underground and above ground leaks as well as the sump pump health test. The customer can operate a sump pump application on the remote device 18. The customer will be able to configure the water level attribute in the application to control the sump pump 20. Also, sump basin fill time can be monitored to detect the potential underground and above-ground leaks or failure.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A system for remotely monitoring and controlling a sump pump, the system comprising:
    a control system in electrical communication with the sump pump, the control system configured to regulate the sump pump based on a measured pressure value and a measured water level value;
    a sensor chamber connected to the sump pump and in communication with the control system, the sensor chamber comprising:
        a primary sensor designed to measure a current pressure value; and
        a secondary sensor designed to measure a current water level value;
    a wireless controller connected to the control system and configured to wirelessly receive monitoring instructions and wirelessly transmit sump pump status data;
    a remote device in communication with the control system that can toggle an operating signal to the sump pump, wherein the operating signal is an "on" signal or an "off" signal, each of the "on" signal and the "off" signal associated with operating the sump pump in response to a water fill time exceeding a threshold value;
    the wireless controller configured to transmit the sump pump status data to the remote device, wherein a user configures a water level set point value in the remote device; and
    a notification system designed to generate and transmit an alert to the remote device when the measured water level value exceeds the water level set point value.

2. The system of claim 1, wherein the remote device is a smartphone, a tablet, a laptop, or an internet-enabled device.

3. The system of claim 1, wherein the remote device is further configured to monitor a plurality of water level attributes.

4. The system of claim 1, wherein the sensor chamber detects the measured water level value in a sump pit.

5. The system of claim 1, wherein the sensor chamber determines the water fill time value by the measured pressure value using the primary sensor and the measured water level value using the secondary sensor.

6. The system of claim 1, wherein the notification system is further configured to generate and transmit the alert to the remote device when the system detects one or more of a locked rotor, an overcurrent, a dry run condition, a clogged discharge line, a high water alarm, a pump failure, a pump malfunction, an above ground leak, or an underground leak.

7. The system of claim 1, wherein the primary sensor is a pressure sensor and the secondary sensor is a capacitive sensor.

8. The system of claim 7, wherein the primary sensor includes a pressure transducer attached to the sensor chamber to detect the measured pressure value, the pressure transducer configured to detect a change in water level that indicates whether the water level is rising or falling.

9. The system of claim 8, wherein the capacitive sensor is affixed adjacent to the pressure transducer of the sensor chamber.

10. A method of monitoring and controlling a sump pump, the method comprising the steps of:
- detecting a water level via a primary sensor;
- detecting a pressure level via a secondary sensor;
- providing the water level and the pressure level to a controller, the controller operating the sump pump;
- determining a water fill time;
- comparing the water fill time to a threshold value;
- toggling an operating signal to the sump pump, wherein the operating signal is an "on" signal or an "off" signal, each of the "on" signal and the "off" signal associated with operating the sump pump in response to the water fill time exceeding the threshold value;
- generating a notification in response to the toggling step; and
- transmitting the notification to a remote device.

11. The method of claim 10, further comprising the step of:
- detecting a change in a water level using a sensor chamber provided including the primary sensor and the secondary sensor.

12. The method of claim 10, further comprising the step of: monitoring the sump pump via a printed circuit board positioned within a housing of the controller that is electrically coupled to a wireless controller.

13. The method of claim 10, further comprising the steps of:
- detecting a failure of the primary sensor via the secondary sensor;
- generating an alert in response to detecting the failure of the primary sensor; and
- transmitting the alert to the remote device.

* * * * *